United States Patent
Altmann et al.

(10) Patent No.: US 10,119,483 B2
(45) Date of Patent: Nov. 6, 2018

(54) AGRICULTURAL WORK MACHINE AND METHOD FOR OPERATING AN AGRICULTURAL WORK MACHINE

(71) Applicant: CLAAS Selbstfahrende Erntemaschinen GmbH, Harsewinkel (DE)

(72) Inventors: Claudius Altmann, Bielefeld (DE); Robert Hohm, Warendorf (DE); Ludger Hugenroth, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 15/609,692

(22) Filed: May 31, 2017

(65) Prior Publication Data

US 2017/0370303 A1   Dec. 28, 2017

(30) Foreign Application Priority Data

Jun. 24, 2016   (DE) .................... 10 2016 111 662

(51) Int. Cl.
  *A01B 67/00* (2006.01)
  *A01D 43/08* (2006.01)
  (Continued)

(52) U.S. Cl.
  CPC ........... *F02D 29/02* (2013.01); *A01D 41/127* (2013.01); *A01D 41/1274* (2013.01);
  (Continued)

(58) Field of Classification Search
  CPC .. A01B 67/00; A01D 41/127; A01D 41/1274; A01D 43/085; A01D 69/00;
  (Continued)

(56) References Cited

U.S. PATENT DOCUMENTS 7,373,239 B2 * 5/2008 Kamado ............... E02F 9/2246
                                                              701/103
8,068,970 B2 * 11/2011 Hugenroth ......... A01D 41/1274
                                                              701/102
(Continued)

FOREIGN PATENT DOCUMENTS

DE   10 2008 020 497 A1   11/2009
DE   10 2008 036 378 A1    2/2010
(Continued)

OTHER PUBLICATIONS

European Search Report for corresponding International Patent Application No. EP 17 15 7431 dated Jun. 13, 2017, 4 pages.

*Primary Examiner* — Robert E Pezzuto
(74) *Attorney, Agent, or Firm* — Lempia Summerfield Katz LLC (57) ABSTRACT

An agricultural work machine, such as a harvester, is disclosed. The agricultural work machine includes an internal combustion engine, at least one working assembly, and a regulating device. The internal combustion engine provides power to the working assembly, with the internal combustion engine being operated in different power settings, with a different performance characteristic in each of the different power settings. The regulating device causes automatic shifting of the internal combustion engine from one power setting to another in response to determining that the power requirements assigned to the working assembly change. The power settings may be assigned to different, pre-selectable power setting ranges, which may differ in terms of the highest respective power setting assigned thereto. Further, the regulating device may only cause shifting of the internal combustion engine between power settings in the respective pre-selected power setting range.

20 Claims, 5 Drawing Sheets

(51) Int. Cl.
*F02D 45/00* (2006.01)
*F02D 29/02* (2006.01)
*A01D 41/127* (2006.01)
*A01D 69/00* (2006.01)

(52) U.S. Cl.
CPC ........... *A01D 43/085* (2013.01); *A01D 69/00* (2013.01); *A01B 67/00* (2013.01)

(58) Field of Classification Search
CPC .. A01F 15/085; A01F 15/0841; F02D 11/105; F02D 29/00; F02D 29/02; F02D 29/06; F02D 31/009; F02D 41/2422; F02D 41/1497; F02D 41/0205; F02D 41/021; F01N 3/2066; B60W 20/11; B60W 20/13; B60W 10/103; B60W 30/18; B60W 50/0098; E02F 9/2246; E02F 9/2075

USPC ............. 37/348; 172/2–11; 414/687; 701/50, 701/54, 84, 101–103, 110
See application file for complete search history.

(56) References Cited

U.S. PATENT DOCUMENTS

| | | | |
|---|---|---|---|
| 8,612,102 B2 * | 12/2013 | Ohhigashi | E02F 9/2075 414/687 |
| 9,822,510 B2 * | 11/2017 | Sakamoto | E02F 9/2075 |
| 2007/0191179 A1 | 8/2007 | Hugenroth et al. | |
| 2010/0268434 A1 | 10/2010 | Hugenroth et al. | |
| 2015/0300275 A1 | 10/2015 | Tiedemann | |

FOREIGN PATENT DOCUMENTS

| | | |
|---|---|---|
| EP | 1 818 524 A1 | 8/2007 |
| EP | 2 832 205 A1 | 2/2015 |
| WO | WO 2014/029410 A1 | 2/2014 |

\* cited by examiner

AGRICULTURAL WORK MACHINE AND METHOD FOR OPERATING AN AGRICULTURAL WORK MACHINE

CROSS REFERENCE TO RELATED APPLICATION

This application claims priority to German Patent Application No. DE 102016111662.9, filed Jun. 24, 2016, the entire disclosure of which is hereby incorporated herein by reference.

TECHNICAL FIELD

This application relates generally to agricultural work machines. More specifically, this application relates to an agricultural work machine that includes an internal combustion engine, at least one working assembly and a regulating device and relates to a method for operating an agricultural work machine in which the internal combustion engine can be operated in different power settings with different performance characteristics, and can be shifted automatically from one power setting to another power setting in response to a change of the working assembly power requirements.

BACKGROUND

An agricultural work machine may comprise any type of work vehicle, such as a work vehicle with its own traction drive (e.g., drive axle with drive wheels) or a work vehicle without its own drive (e.g. a trailer). Example work vehicles may include agricultural work machines, such as field choppers or tractors, which may or may not include additions such as manure spreaders, seeders, spraying devices, separators, rakes or the like.

Various processes of an agricultural work machine may run automatically or semi-automatically, such as, among other things, the operation and control of a majority of the working assemblies of the work machine. A working assembly may comprise a component of the work machine that supports or performs an agricultural task, and consequently consumes power. Attachments for the work machine may include the aforementioned additions (e.g., manure spreaders, seeders, spraying devices, separators, rakes or the like) or may include reels or cutting units, or the front linkage for raising and lowering the attachments.

The agricultural work machines may typically have an internal combustion engine, such as a diesel motor, as the collective drive for the working assemblies and the traction drive. In this regard, the power supplied by the internal combustion engine may be supplied in part to the traction drive and in part to the respective working assembly (in the event that the work machine has a traction drive).

The power requirement of a working assembly may vary dependent on the situation in which the agricultural work operates. For example, during a harvesting process, the working assembly may require more power in a field having a relatively dense crop than in a field having a less dense crop or in the headland. Thus, for purposes of power conservation and reduction of wear, the maximum available power of the internal combustion engine may be automatically reduced.

DE 10 2008 020 497 A1 describes a regulating concept, in which the internal combustion engine that has a different performance characteristic (motor characteristic). The internal combustion engine is automatically operated in different power settings via the regulating device depending on the actual power requirements of the working assembly. The performance characteristics of the power settings differ in terms of the maximum power of the internal combustion engine, which is normally reached in the various power settings with the same rotational rate.

For example, if a harvester is driven in a headland, the regulating device, because of the reduced power requirements of the respective working assembly, increases the rotational rate at the drive shaft of the internal combustion engine, and shifts the internal combustion engine thereupon, potentially multiple times successively, to a lower power setting having a lower maximum power. As a result, the rotational rate of the drive shaft, and potentially the torque, is reduced. After passing through the headland, the harvester drives back into the crop that is to be harvested while the internal combustion engine is still operated in the lower power setting, resulting in the power requirements of the respective working assembly again increasing. As a result, the rotational rate of the drive shaft is reduced, and the regulating device causes a shifting of the internal combustion engine into a higher power setting, potentially likewise via numerous power settings, in order that the internal combustion engine can again provide a higher power.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

The internal combustion engine disclosed in the background may be operated by the regulating device in a power setting that is higher than is necessary for the respective purpose or under the respective environmental conditions. In particular, different demands may be placed on the motor performance depending on the environmental parameters, e.g. the nature of the crop or subsoil, and the attachment (e.g., collectors, cutting units, corn header, corn picker, etc.) that is to be used. Not every crop (e.g., relatively dense crop, less dense crop, etc.) and not every attachment have the same maximum power requirements. Operating the internal combustion engine in too high a power setting may lead to an increase in fuel consumption, and accordingly an increase in the polluting emissions. Thus, in one implementation, the agricultural work machine as disclosed may reduce fuel consumption and polluting emissions.

The agricultural work machine may comprise a harvester, such as a combine harvester or a field chopper. The agricultural work machine has an internal combustion engine, which can be operated in different power settings, with the work machine having a different performance characteristic when operated in each of the different power settings. The power settings may differ from one another in one or more respects. In one implementation, the difference in power settings may be infinitesimally small. Further, the power settings may differ from one another in the course of the performance depending on the rotational rate of the drive shaft of the internal combustion engine and in particular in terms of the maximum power available from the internal combustion engine.

In one implementation, the power settings are assigned to various, pre-selectable power setting ranges, which differ from one another at least in the highest relative assigned power settings. At least two power setting ranges, preferably at least three power setting ranges, are provided thereby, each of which comprises one or more power settings.

By way of example, a total of ten power settings are provided, which differ in terms of the maximum power available from the internal combustion engine. If three power setting ranges are provided in this case, it is contemplated that a first power setting range comprises the three power settings having the lowest maximum power available from the internal combustion engine (i.e., the three lowest power settings), a second power setting range comprises the seven power settings having the lowest maximum power available from the internal combustion engine (i.e. the seven lowest power settings), and a third power setting range comprises all of the power settings. Other numbers of power settings and other numbers of power setting ranges are contemplated.

Furthermore, at least one working assembly is provided, which can be supplied with power from the internal combustion engine. The working assembly may comprise, for example, an attachment such as a collector ("pick-up"), a cutting unit, in particular a direct cutting unit ("direct disk"), a corn header or a corn picker. Other working assemblies are contemplated.

In order to regulate the internal combustion engine during operation, and to shift the internal combustion engine between the power settings, a regulating device is further provided. The regulating device is in communication with the internal combustion engine and enables an automated shifting of the internal combustion engine from one of the power settings to another of the power settings. In particular, the regulating device enables a shift to a next power setting (e.g., a shift to a power setting having the next higher or the next lower maximum power available from the internal combustion engine).

A "shifting" as disclosed herein does not necessarily mean a shifting operation of a transmission. Rather, a "shifting" may comprise, in general, the setting of another (e.g., higher or lower) power setting in which the internal combustion engine is operated. This may occur, for example, by changing the injection volume or changing the fuel mixture, in particular the combustion air ratio, to name just a couple of examples. Other modifications of the internal combustion engine resulting in a "shift" are contemplated.

The shifting may occur automatically. In one implementation, the shifting may occur in response to (e.g., as soon as) a determination that the power requirements for the at least one working assembly have changed. The shifting occurs thereby, according to one implementation, only between power settings in the respective pre-selected power setting range.

The regulating concept according to one implementation has the advantage that the power settings available for the regulation can be adapted individually to a concrete or predefined requirement. For example, first a power setting range may be pre-selected, and thereafter the automated power requirement dependent regulation may only be carried out using the power settings in the respective pre-selected power setting range. As a result, the internal combustion engine can only be operated by the regulating device in the power settings that are optimal for the respective purpose or under the respective environmental conditions. By way of example, a power setting range can be selected, when a relatively dense crop is to be processed or harvested, that comprises power settings having an average higher relative maximum power, or preferably all of the power settings. If in contrast, a less dense crop is to be processed, a power setting range can be selected comprising power settings having an average relative lower maximum power. Accordingly, the power setting range to be used can also be adapted to different attachments that differ in terms of the maximum power requirements. In this manner, fuel consumption and polluting emissions may be significantly reduced.

In one implementation, the regulating device enables a manual pre-selection of a power setting range ($B_{LS}$). In particular, the regulating device allows for a pre-selection of one of the power setting ranges in which the internal combustion engine can be shifted between power settings. For example, the regulating device allows for a manual pre-selection, such as a manual selection by the driver. Prior to starting the respective work or harvesting process, or when a change in the nature of the crop that is to be processed has been determined, the driver can set a specific power setting range manually, which is better adapted according to the driver's experience to the expected power requirements.

The regulating device may be configured thereby, in particular, to first cause a shifting from a higher power setting range to a lower power setting range when the actual power requirements of the at least one working assembly have fallen below a pre-definable target value. In particular, the regulating device may be configured to first cause a shifting from a higher power setting range ($B_{LS}$) to a lower power setting range ($B_{LS}$) when the actual power requirements of the at least one working assembly have fallen below a predefined target value. As a result, undesired power limiting need not occur through setting a power setting range in which the power settings have a maximum power that is too low for the work to be carried out at a particular moment by the working assembly. The power limiting may first occur when the required power of the internal combustion engine falls below the power of the highest performance characteristic of the previously selected power setting range (e.g., at the same rotational rate of the drive shaft of the internal combustion engine). This function serves as a reliable protection against inadvertent power limiting and to prevent the risk of a part of the device or a working assembly becoming clogged.

In accordance with one implementation, the design of the agricultural work machine may include a display that is configured for displaying the actual power requirements of the at least one working assembly to an operator (the driver). In particular, the display is also configured to display, together with the actual power requirements of the at least one working assembly, the pre-selected power setting range and/or the maximum power of the power settings of the respective pre-selected power setting range in which the maximum power is highest, to the operator. In this manner, the driver may be informed regarding the actual power requirements. In this way, the driver may more accurately estimate when a change in the power setting range that has been set to makes sense.

The working assembly that serves to perform or support agricultural work may be selected from a group comprising hydraulically driven working assemblies, and rotatory driven working assemblies, wherein the working assembly is, in particular, an attachment to the work machine. One example of a hydraulically driven working assembly is the front linkage of a field chopper or combine harvester, which also supports the attachment, e.g. a cutting unit. One example of a rotatory driven working assembly is the cutting unit or the conveyor with which the cuttings are conveyed to the threshing unit. Another example of a rotary driven working assembly is the threshing drum of the threshing unit.

The regulating device can furthermore be configured to then cause an automated shifting of the internal combustion engine between power settings, such as for example, between power settings of the respective pre-selected power setting range, when the internal combustion engine is operated in a predefined rotational rate range. As one example, the rotational rate range may be greater than 1700 rpm, preferably greater than 1750 rpm, particularly preferably greater than 1800 rpm, and/or less than 2000 rpm, preferably less than 1950 rpm, particularly preferably less than 1900 rpm. The power provided by the internal combustion engine is highest in these rotational rate ranges, and is also relatively constant over the rotational rate range.

The regulating device in accordance with one implementation may also allow for a pre-selection thereby (e.g., a manual pre-selection) of a rotational rate range in which the internal combustion engine can be shifted between power settings of the respective pre-selected power setting range. This enables the driver to displace the shifting limits in which shifting occurs between power settings to another range (e.g. lower range), wherein the scope of the rotational rate range (e.g., 100 rpm) is preferably maintained. In this manner, fuel consumption and polluting emissions can be further lowered.

In one implementation, the agricultural work machine may be provided with its own traction drive, which may comprise a drive axle and/or drive wheels, and which may be supplied with power from the internal combustion engine. The work machine can however, alternatively, also be designed as a vehicle without its own drive (e.g., as a trailer). In the case of the presence of a traction drive, the internal combustion engine can be regulated, in particular such that when shifting the internal combustion engine from one of the power settings into another of the power settings, the rotational rate of the traction drive, and thus the driving speed, remains substantially constant. "Substantially" means that the rotational rate of the traction drive, and thus the driving speed, can vary slightly due to the nature of the terrain (e.g., rising, sloped, slippery subsoil, etc.), but when the nature of the terrain remains constant, the rotational rate can be kept constant.

According to a further implementation, which is of independent significance, a method for operating an agricultural work machine, in particular an agricultural work machine such as defined above, is disclosed. In particular, according to the method, an internal combustion engine may be operated in different power settings, in which the internal combustion engine has a different performance characteristic in respective different power settings, and can be shifted automatically from one of the power settings to another of the power settings, in response to (e.g., as soon as) a determination is made that the power requirements of the at least one working assembly change. According to one aspect, it is provided thereby that the power settings are assigned to different power setting ranges, which differ in terms of the average maximum power available from the internal combustion engine, and that the internal combustion engine is only shifted between power settings of a power setting range.

Figure 1:
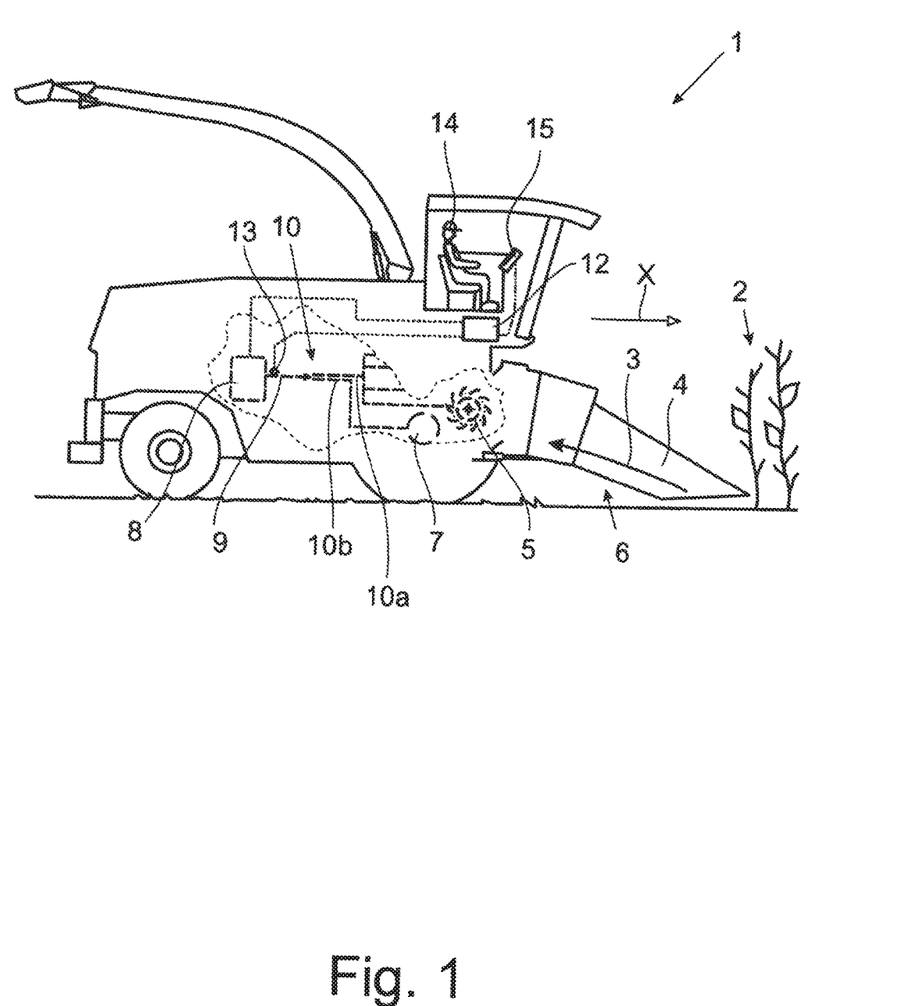
FIG. 1 shows an agricultural work machine according to one implementation, while driving through a crop.

Referring to the figures, an agricultural work machine 1 according to one implementation in the form of a field chopper is depicted in FIG. 1. The agricultural work machine 1 is driven in a direction of travel X through a crop 2 (e.g., a corn field). A crop flow 3 of plant parts is drawn through an intake duct 4 during operation and for purposes of further reduction, fed to a working assembly 5 in the form of a chopper drum. The intake duct 4 is a component of an attachment 6, which also has a cutting unit (not shown).

The agricultural work machine 1 is designed here, by way of example, as a self-driving harvester, and has a traction drive 7 having a drive axle for drive wheels (not shown).

An internal combustion engine 8 serves as the drive for the depicted and other (not shown) working assemblies 5, as well as the traction drive 7. The internal combustion engine 8 transfers available power to a drive train 10 via its drive shaft 9, which is divided into a first sub-drive train 10*a* leading to the working assembly 5, and a second sub-drive train 10*b* leading to the traction drive 7.

Figure 2A:
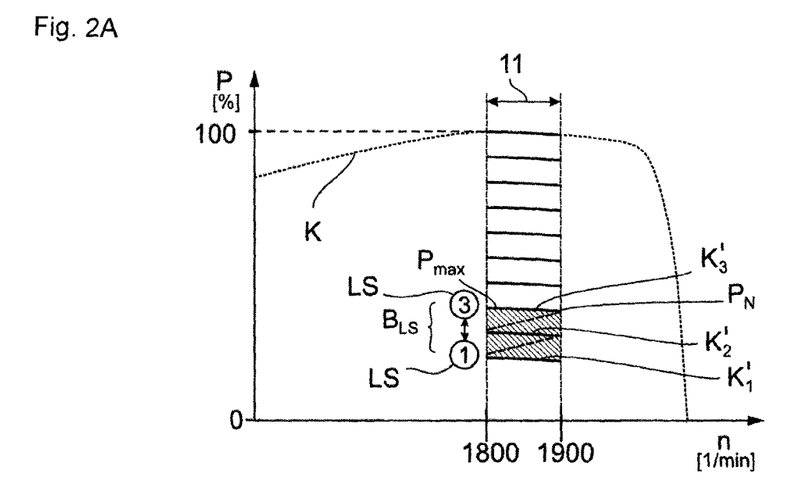
FIG. 2a shows a characteristic curve diagram of a work machine according to FIG. 1 when the internal combustion engine is operated in the highest power setting of a first power setting range.
Figure 3A:
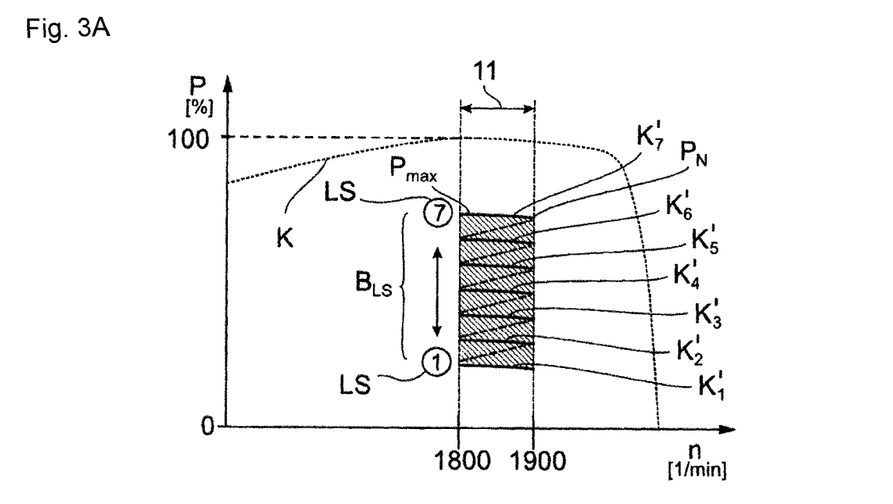
FIG. 3a shows a characteristic curve diagram of a work machine according to FIG. 1, when the internal combustion engine is operated in a medium power setting of a second power setting range.
Figure 4A:
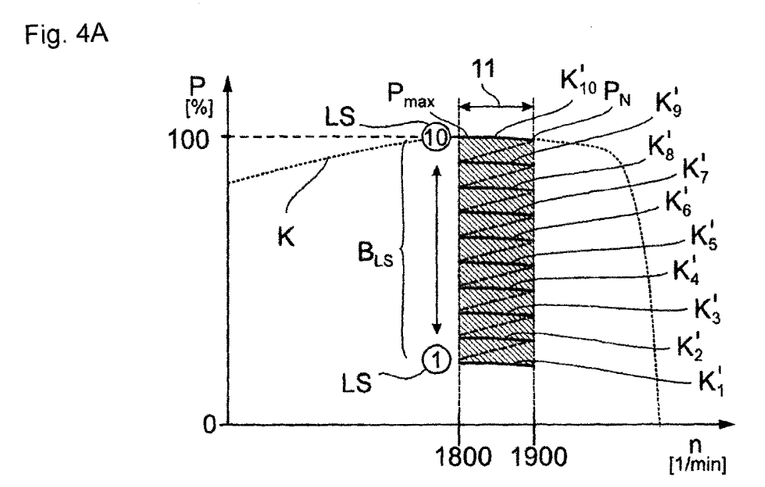
FIG. 4a shows a characteristic curve diagram of a work machine according to FIG. 1 when the internal combustion engine is operated in the second-highest power setting of a third power setting range.

The internal combustion engine 8 can be operated in different power settings LS (e.g., ten power settings LS illustrated here), which are symbolized in FIGS. 2*a*, 3*a* and 4*a* by corresponding numerals in a circle. The internal combustion engine has a different performance characteristic (e.g., motor characteristic) K in each power setting LS. The performance characteristics K define the (absolute) curve of the power P (in kW) in relation to the rotational rate n (in rpm) for the respective power setting LS, wherein the performance characteristics K of the power settings LS differ in terms of the amount of power P provided to the drive shaft 9 by the internal combustion engine 8 as a function of the rotational rate n. For reasons of clarity, only the performance characteristics K of the highest power settings LS of the internal combustion engine 8 are depicted in FIGS. 2*a*, 3*a* and 4*a*, i.e. the power settings LS in which the power P that can be supplied via the drive shaft 9 is highest.

Furthermore, another curve $K'_1, K'_2, K'_3, \ldots K'_{10}$ is depicted in FIGS. 2*a*, 3*a* and 4*a* for each available power setting LS, which defines the proportional curve of the power P (in percentages) in relation to the rotational rate n (in rpm). The maximum power $P_{max}$ corresponds to a power of 100% thereby, which lies in the maximum of the respective curve.

Lastly, another predefined rotational rate range 11 is depicted in FIGS. 2a, 3a and 4a, which is distinguished by a relatively constant power P. The rotational rate at which the maximum power $P_{max}$ is available also lies in this rotational rate range 11. The upper limit of the rotational rate range 11 is defined by the nominal power $P_N$, which is 1900 rpm here. The lower limit is 100 rpm lower here, by way of example, and lies at 1800 rpm.

The internal combustion engine 8 is shifted between different power settings LS in this rotational rate range 11, depending on the actual power requirements of the working assembly 5. In order to regulate the internal combustion engine 8, and in particular in order to shift between the power settings LS, a regulating device 12 is provided. In one implementation, the regulating device 12 may comprise hardware or a combination of hardware and software. As one example, the regulating device 12 (or a subpart thereof) may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, the regulating device 12 (or a subpart thereof) may include memory hardware that comprises instructions executable with a processor or processor circuitry to implement one or more of the features of the module.

The regulating device 12 shifts the internal combustion engine 8 thereby, fundamentally in order to keep the driving speed or the rotational rate of traction drive 7 constant. As soon as the rotational rate n of the drive shaft 9 of the internal combustion engine 8 threatens to abandon, or abandons the predefined rotational rate range 11 when operating the agricultural work machine 1, due to a change in the power requirements of the working assembly 5, the regulating device 12 may cause a shifting into the respective next power setting LS. In this regard, the shift into the respective next power setting LS may occur automatically. For example, if the rotational rate n then increases in a power setting LS to over 1900 rpm due to a reduced power requirement, the next lower power setting LS is shifted to automatically, in which the power P is 10% lower, and the rotational rate n is 100 rpm lower. If, in contrast, the rotational rate n drops below 1800 rpm in one of the power settings LS due to an increased power requirement, the next higher power setting LS is shifted to automatically, in which the power P is increased by 10% accordingly, and the rotational rate n is 100 rpm higher. The rpms and power percentages are for illustration purposes. Other rpms and power percentages are contemplated. The respective rotational rate n of the drive shaft 9 may be continuously determined by a rotational rate sensor 13 thereby, and displayed to the driver 14 via a display 15. Display 15 is one example of a display device configured to output information to the operator.

According to one aspect, as shown in a comparison of FIGS. 2a, 3a and 4a, the power settings LS are assigned to different power setting ranges $B_{LS}$, which differ at least in terms of the highest respective power settings assigned thereto. A first power setting range $B_{LS}$ comprising the three lowest power settings LS is depicted in FIG. 2a. A second power setting range $B_{LS}$ comprising the seven lowest power settings LS is depicted in FIG. 3a. A third power setting range $B_{LS}$ comprising all ten of the power settings LS is depicted in FIG. 4a.

The regulating device 12 is then configured in one implementation such that a shifting of the internal combustion engine 8 is only possible between power settings LS in the respective pre-selected power setting range $B_{LS}$. For this, for example, the driver 14 pre-selects a specific power setting range $B_{LS}$ prior to or during a processing of the crop 2, which in driver's opinion is optimally adapted to the attachment 6 being used and the nature of the crop 2. The automatic shifting between the power settings LS described above then occurs in this pre-selected power setting range $B_{LS}$. For safety reasons, it is provided thereby in an exemplary implementation of an agricultural work machine 1 described herein, that with a manual pre-selection by the driver 14, a shifting from a higher power setting range $B_{LS}$ to a lower power setting range $B_{LS}$ first then occurs when the actual power requirements of the at least one working assembly 5 have fallen below a predefined target value.

Figure 2B:
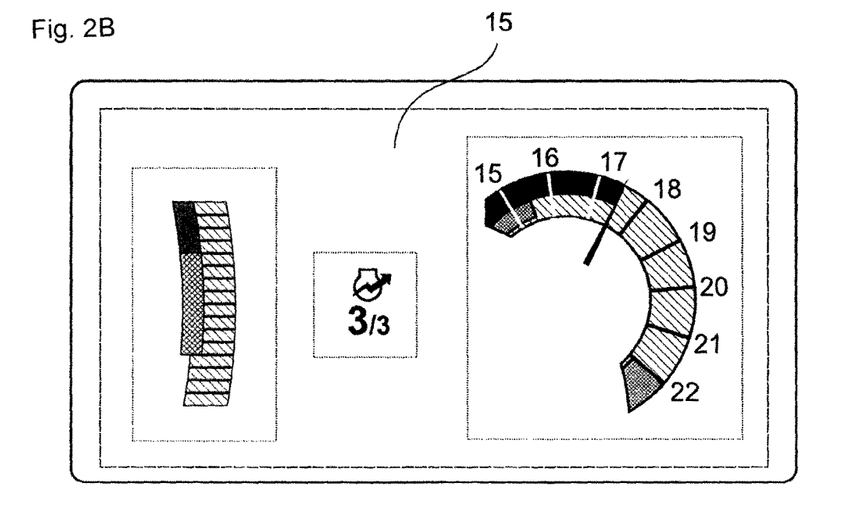
FIG. 2b shows information presented to the driver in a display during the operation of the internal combustion engine in the highest power setting of the first power setting range.
Figure 3B:
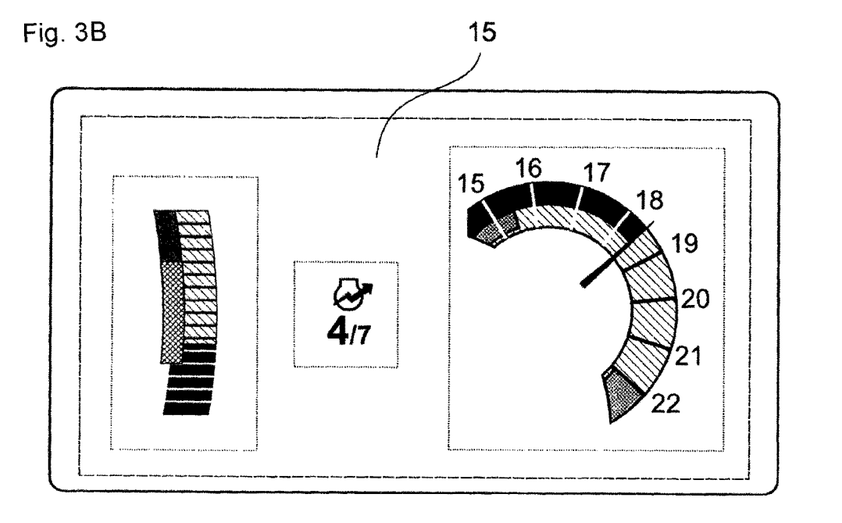
FIG. 3b shows information shown to the driver in a display during the operation of the internal combustion engine in the medium power setting of the second power setting range.
Figure 4B:
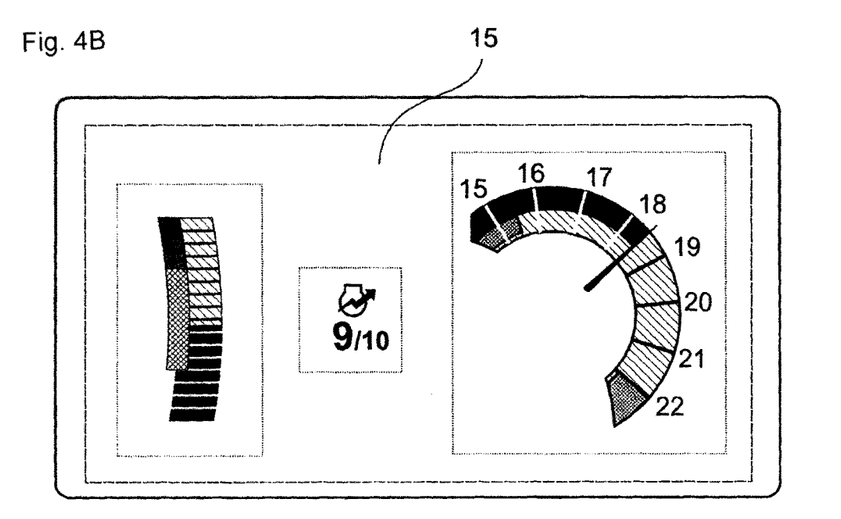
FIG. 4b shows the information shown to the driver in a display during the operation of the internal combustion engine in the second-highest power setting of the third power setting range.

In order to provide the driver 14 with a control possibility during the processing of the crop 2, and a selection aid for pre-selecting the power setting range $B_{LS}$, the current power setting LS and the highest power setting LS available in the respective pre-selected power setting range $B_{LS}$ are displayed (e.g., FIGS. 2b, 3b, 4b, in the middle in each case) in the display 15, in addition to the rotational rate n (e.g., FIGS. 2b, 3b, 4b, at the right in each case). Furthermore, the capacity of the internal combustion engine 8 is also displayed (e.g., FIGS. 2b, 3b, 4b, at the left in each case).

Figure 5A:
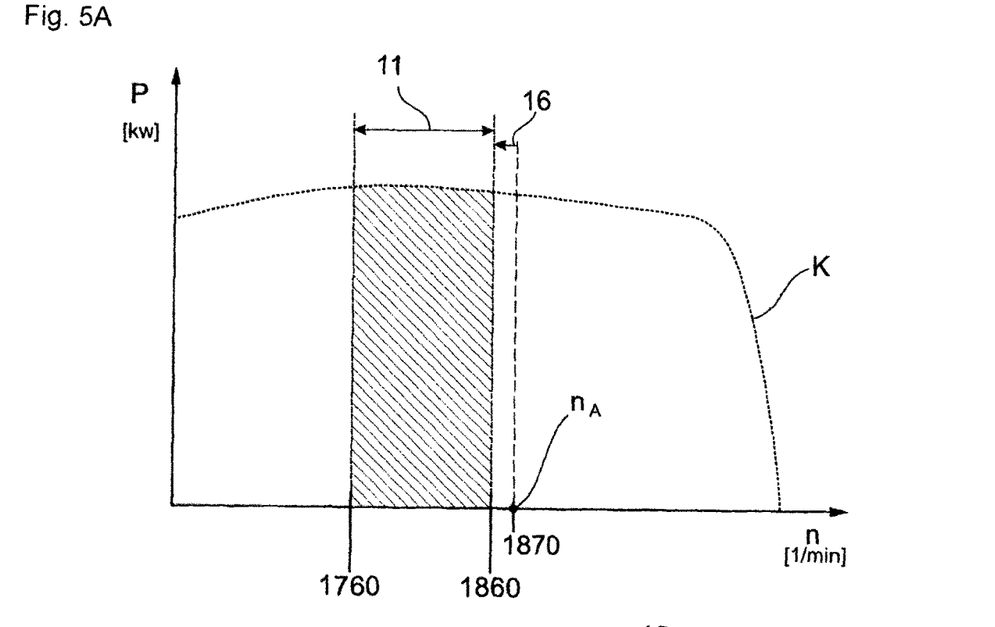
FIG. 5a shows a characteristic curve diagram of a work machine according to FIG. 1 with a highlighted rotational rate range.

A performance characteristic K of an internal combustion engine 8 and a defined rotational rate range 11 are likewise depicted in FIG. 5a. The upper limit is 1860 rpm and the lower limit is 1760 rpm here. The current working rotational rate $n_A$ that has been set is indicated by a vertical broken line, thus the actual rotational rate specification of the drive shaft 9 for the agricultural processing that is to be carried out. This may be reduced here, for example manually (by the driver), from 1910 rpm ("full speed operation") to 1870 rpm. One reason why the driver would choose to reduce the working rotational rate $n_A$ is that, for example, the expected power requirements of the working assembly 5 are lower than before for the agricultural processing that is to be carried out, and by reducing the working rotational rate $n_A$, the fuel consumption and the polluting emissions can be reduced.

If the shifting limits at which a shifting occurs between power settings LS are set, e.g. with the upper limit at 1900 rpm and the lower limit at 1800 rpm in FIGS. 2a, 3a and 4a, the described automatic shifting of the internal combustion engine 8 from one of the power settings LS to another of the power settings LS can only be caused substantially in full gas operation, but not at arbitrary lower working rotational rates $n_A$, in particular not at half-throttle. In order, however, to enable the automated shifting at arbitrary working rotational rates $n_A$, it is optionally provided that with the working rotational rate $n_A$, the shifting limits are automatically displaced, wherein the range of the rotational rate range 11, which is 100 rpm, for example, is preferably maintained.

An offset 16 to the rotational rate range 11 lying within the shifting limits can be provided thereby, which is 10 rpm here, by way of example. With a working rotational rate $n_A$ of 1870 rpm, the upper limit of the rotational rate is automatically displaced to 1860 rpm, and the lower limit to 1760 rpm.

Figure 5B:
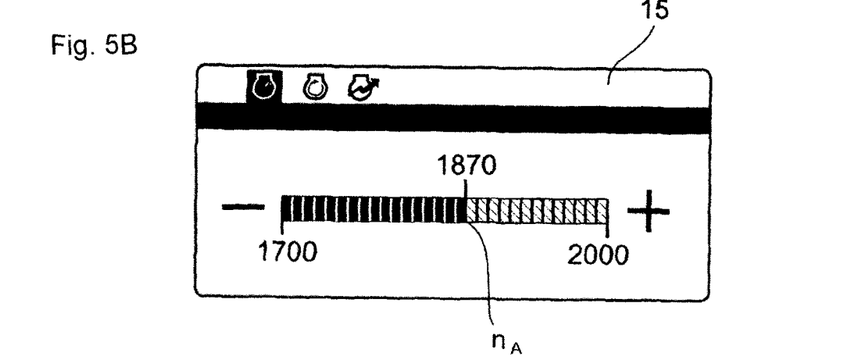
FIG. 5b shows the information shown the driver in a display regarding the currently set upper limit of the rotational rate range.

In accordance with FIG. 5b, the currently set working rotational rate $n_A$ can be displayed on the display 15, or it can be manually displaced directly if the display is a touchscreen. The rotational rate range 11, or its shifting limits, are displaced automatically thereby.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

REFERENCE SYMBOLS 1 agricultural work machine
2 crop
3 crop flow
4 intake duct
5 working assembly
6 attachment
7 traction drive
8 internal combustion engine
9 drive shaft
10 drive train
10a first sub-drive train
10b second sub-drive train
11 rotational rate range
12 regulating device
13 rotational rate sensor
14 driver, operator
15 display
16 offset
X direction of travel
P power
$P_{max}$ maximum power
$P_N$ nominal power
n rotational rate
$n_A$ working rotational rate
LS power setting
$B_{LS}$ power setting range
K performance characteristic (absolute power)
$K'_1$ . . . $K'_{10}$ performance characteristics (proportional power)

The invention claimed is:

1. An agricultural work machine comprising:
    an internal combustion engine configured for operation in a plurality of power settings, wherein operation in each of the plurality of the power settings results in a different performance characteristic of the internal combustion engine and wherein each of the plurality of the power settings is assigned to a different, pre-selectable power setting range, which differ at least in terms of a highest respective assigned power setting;
    at least one working assembly configured to receive power from the internal combustion engine; and
    a regulating device in communication with the internal combustion engine and configured to:
        determine whether power requirements to the at least one working assembly change; and
        responsive to determining that the power requirements to the at least one working assembly have changed, cause an automatic shift of the internal combustion engine only between power settings of a respective pre-selected power setting range.

2. The agricultural work machine of claim 1, wherein the regulating device is configured to receive a manual pre-selection of the power setting range.

3. The agricultural work machine of claim 2, wherein the regulating device is configured to first cause a shifting from a higher power setting range to a lower power setting range when actual power requirements of the at least one working assembly have fallen below a predefined target value.

4. The agricultural work machine of claim 3, further comprising a display device configured to display the actual power requirements for the at least one working assembly to an operator.

5. The agricultural work machine of claim 4, wherein the display device is further configured to display, together with the actual power requirements of the at least one working assembly, the pre-selected power setting range.

6. The agricultural work machine of claim 5, wherein the display device is further configured to display to the operator maximum power of the power setting of the pre-selected power setting range in which maximum power is highest.

7. The agricultural work machine of claim 1, wherein the working assembly is selected from a group comprising hydraulically driven working assemblies and rotary driven working assemblies; and
    wherein the working assembly is an attachment of the agricultural work machine.

8. The agricultural work machine of claim 7, wherein the working assembly comprises a cutting unit.

9. The agricultural work machine of claim 1, wherein the regulating device is configured to then cause an automatic shifting of the internal combustion engine between the power settings of the pre-selected power setting range when the internal combustion engine is operated in a predefined rotational rate range.

10. The agricultural work machine of claim 9, wherein the regulating device is configured to enable a pre-selection of the predefined rotational rate range that defines the shifting of the internal combustion engine between the power settings of the pre-selected power setting range.

11. The agricultural work machine of claim 10, wherein the regulating device is configured for a manual pre-selection of the predefined rotational rate range.

12. The agricultural work machine of claim 1, further comprising a traction drive configured to receive the power provided by the internal combustion engine; and
    wherein the regulating device is further configured to control the internal combustion engine such that when the internal combustion engine is shifted from one of the power settings to another of the power settings, rotational rate of the traction drive remains substantially constant.

13. A method for operating an agricultural work machine, the method comprising:
    supplying power to at least one working assembly, the power being generated by an internal combustion engine of the agricultural work machine, the internal combustion engine configured for operation in a plurality of power settings, wherein operation in each of the plurality of the power settings results in a different performance characteristic of the internal combustion engine and wherein each of the plurality of the power settings is assigned to a different, pre-selectable power setting range, which differ at least in terms of a highest respective assigned power setting;
    determining, by a regulating device, whether power requirements to the at least one working assembly have changed; and
    responsive to determining that the power requirements to the at least one working assembly have changed, automatic shift of the internal combustion engine only between power settings of a respective pre-selected power setting range.

14. The method of claim 13, further comprising receiving, by the regulating device, a manual pre-selection of the power setting range.

15. The method of claim 14, wherein the regulating device is configured to first cause a shifting from a higher power setting range to a lower power setting range when actual power requirements of the at least one working assembly have fallen below a predefined target value.

16. The method of claim 15, further comprising displaying the actual power requirements for the at least one working assembly to an operator.

17. The method of claim 16, further comprising displaying, together with the actual power requirements of the at least one working assembly, the pre-selected power setting range.

18. The method of claim 17, further comprising displaying maximum power of the power setting of the pre-selected power setting range in which maximum power is highest.

19. The method of claim 13, further comprising causing, by the regulating device, an automatic shifting of the internal combustion engine between the power settings of the pre-selected power setting range when the internal combustion engine is operated in a predefined rotational rate range.

20. The method of claim 13, further comprising:
- supplying power to a traction drive, the power being generated by the internal combustion engine; and
- controlling the internal combustion engine such that when the internal combustion engine is shifted from one of the power settings to another of the power settings, rotational rate of the traction drive remains substantially constant.

* * * * *